United States Patent
Li et al.

(10) Patent No.: US 12,199,504 B2
(45) Date of Patent: Jan. 14, 2025

(54) CONTROL CIRCUIT FOR A TOTEM POLE POWER FACTOR CORRECTION CIRCUIT AND THE METHOD THEREOF

(71) Applicant: Chengdu Monolithic Power Systems Co., Ltd., Chengdu (CN)

(72) Inventors: Guangzhuo Li, Hangzhou (CN); Pengfei Liu, Hangzhou (CN); Siran Wang, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 236 days.

(21) Appl. No.: 17/986,530

(22) Filed: Nov. 14, 2022

(65) Prior Publication Data

US 2023/0163679 A1 May 25, 2023

(30) Foreign Application Priority Data

Nov. 24, 2021 (CN) .......................... 202111402582.2

(51) Int. Cl.
*H02M 1/42* (2007.01)
*H02M 1/00* (2006.01)

(52) U.S. Cl.
CPC ....... *H02M 1/4208* (2013.01); *H02M 1/0009* (2021.05); *H02M 1/0025* (2021.05)

(58) Field of Classification Search
CPC ............ H02M 1/4208; H02M 1/0009; H02M 1/0025; H02M 1/0032; H02M 1/0048
See application file for complete search history.

(56) References Cited

U.S. PATENT DOCUMENTS

| | | | |
|---|---|---|---|
| 8,766,605 B2 | 7/2014 | Ren et al. | |
| 9,130,473 B2 | 9/2015 | Lin et al. | |
| 9,479,046 B2 | 10/2016 | Lin et al. | |
| 10,855,171 B2 | 12/2020 | Lu | |
| 2015/0323949 A1* | 11/2015 | Saint-Pierre | H02M 1/4225 323/208 |
| 2020/0244159 A1* | 7/2020 | Lu | H02M 1/4266 |

* cited by examiner

*Primary Examiner* — Jue Zhang
*Assistant Examiner* — Afework S Demisse
(74) *Attorney, Agent, or Firm* — Perkins Coie LLP

(57) ABSTRACT

A totem pole PFC (Power Factor Correction) circuit, having: a first switch, a second switch and a control circuit. When the totem pole PFC circuit works in CCM (Continuous Current Mode), the control circuit is configured to turn on a main switch when a current detecting signal indicative of an AC input current of the totem pole PFC circuit decreases to a current valley reference signal, and keep the main switch ON for a first on-time period. When the totem pole PFC circuit works in DCM (Discontinuous Current Mode), the control circuit is configured to turn on the main switch at a valley of a switching voltage after expiry of a time delay started from when the AC input current decreases to zero, and keep the main switch ON for a second on-time period.

20 Claims, 7 Drawing Sheets

CONTROL CIRCUIT FOR A TOTEM POLE POWER FACTOR CORRECTION CIRCUIT AND THE METHOD THEREOF

REFERENCE TO RELATED APPLICATIONS

This application claims priority to and the benefit of Chinese Patent Application No. 202111402582.2, filed on Nov. 24, 2021, which is incorporated herein by reference in its entirety.

TECHNICAL FIELD

The present invention relates generally to switching power supplies, and more particularly but not exclusively to totem pole PFC (Power Factor Correction) circuits.

BACKGROUND OF INVENTION

In the power supply field, the design of PFC topology becomes more and more important for improving circuit efficiency. Power factor is the ratio of energy that a device could transmit to an output terminal to the total amount of energy taken from a power source through an input terminal, i.e., higher PFC value means higher power conversion efficiency. The technology used for improving the power factor of an electrical equipment is called power factor correction. The conventional PFC topologies includes a full bridge PFC, a half bridge PFC and a bridgeless PFC. The totem pole PFC is one of the bridgeless PFC, and has the advantages of low conduction loss and high circuit efficiency.

FIG. 1 shows the topology diagram of a prior art totem pole PFC circuit 10. As shown in FIG. 1, the totem pole PFC circuit 10 comprises: an inductor L1 coupled to an AC power supply Vsource, a first bridge arm includes a first switch P1 and a second switch P2, a second bridge arm includes a third switch P3 and a fourth switch P4, and an output capacitor Cout. In a PFC circuit with peak current control or average current control, a current IL flowing through the inductor L1 needs to be sampled to form a feedback mechanism. In FIG. 1, a detecting resistor Rcs is coupled in series with the inductor L1, a current detecting circuit 101 is coupled to the detecting resistor Rcs to sense a voltage across the detecting resistor Rcs and provides a current detecting signal Vcs indicative of an AC input current of the totem pole PFC circuit 10. In the application of FIG. 1, one terminal of the detecting resistor Rcs is coupled to the AC power supply Vsource through the inductor L1, another terminal of the detecting resistor Rcs is coupled to an output voltage Vout through the switch P1. Because the voltage value of the AC power supply Vsource and the output voltage Vout are very high, a high voltage isolation device or a Hall device is needed in the current detecting circuit 101, resulting in higher cost of the circuit.

FIG. 2 shows the topology of a prior art totem pole PFC circuit 20. Compared with FIG. 1, the detecting resistor Rcs in FIG. 2 is coupled to a ground reference GND, thus no high voltage is involved, and no high voltage device is needed. However, because of the location of the detecting resistor Rcs in FIG. 2, only current flowing through sync switches could be detected, i.e., in the positive half cycle of the AC power supply Vsource, only the current flowing through the switch P1 is detected, and in the negative half cycle of the AC power supply Vsource, only the current flowing through the switch P2 is detected. In either case, only the decreasing part of an inductor current IL could be detected. Due to lack of the increasing part information of the inductor current IL, the peak current control or average current control could not be realized, which means the totem pole PFC circuit could not work in CCM (Continuous Current Mode), resulting in low circuit efficiency.

SUMMARY OF THE INVENTION

It is an object of the present invention to provide a constant on-time scheme to control a totem pole PFC circuit. By fixing an on-time of a main switch in the totem pole PFC circuit, an increasing part of an inductor current in not necessary, and a detecting resistor is configured to detect a decreasing part of the inductor current. Therefore, the detecting resistor could be placed at a low side, i.e., connected to a ground reference, and high voltage devices for detecting the inductor current could be saved.

In accomplishing the above and other objects, there has been provided, in accordance with an embodiment of the present invention, a totem pole PFC circuit, comprising: a first switch and a second switch coupled in series between an output voltage of the totem pole PFC circuit and a ground reference; and a control circuit configured to: i) when the totem pole PFC circuit works in CCM (Continuous Current Mode), turn on a main switch when a current detecting signal indicative of an AC input current of the totem pole PFC circuit decreases to a current valley reference signal, and keep the main switch ON for a first on-time period; and ii) when the totem pole PFC circuit works in DCM (Discontinuous Current Mode), turn on the main switch at a valley of a switching voltage after expiry of a time delay started from when the AC input current decreases to zero, and keep the main switch ON for a second on-time period; wherein the switching voltage is a voltage at a connection node of the first switch and the second switch, and wherein the second switch is the main switch when an AC input voltage of the totem pole PFC is in a positive half cycle, and the first switch is the main switch when the AC input voltage is in a negative half cycle.

In accomplishing the above and other objects, there has been provided, in accordance with an embodiment of the present invention, a control method of a totem pole PFC circuit having a first switch and a second switch coupled in series between an output voltage and a ground reference, and having a third switch and a fourth switch coupled in series between the output voltage and the ground reference, the control method comprising: when the totem pole PFC circuit works in CCM (Continuous Current Mode), turning on a main switch when a current detecting signal indicative of an AC input current of the totem pole PFC circuit decreases to a current valley reference signal, and keeping the main switch ON for a first on-time period; and when the totem pole PFC circuit works in DCM (Discontinuous Current Mode), turning on the main switch at a valley of a switching voltage after expiry of a time delay started from when the AC input current of the totem pole PFC circuit decreases to zero, and keeping the main switch ON for a second on-time period; wherein the switching voltage is a voltage at a connection node of the first switch and the second switch, and wherein the second switch is the main switch when an AC input voltage of the totem pole PFC is in the positive half cycle, and the first switch is the main switch when the AC input voltage is in the negative half cycle.

In accomplishing the above and other objects, there has been provided, in accordance with an embodiment of the present invention, a control method of a totem pole PFC circuit having a first switch and a second switch coupled in series between an output voltage and a ground reference, and having a third switch and a fourth switch coupled in series between the output voltage and the ground reference, the control method comprising: determining whether an AC input voltage of the totem pole PFC circuit is in the positive half cycle or in the negative half cycle; when the AC input voltage is in the positive half cycle, i) keeping the third switch on and keeping the fourth switch off; and ii) controlling the second switch as a main switch and controlling the first switch as a sync switch; when the AC input voltage is in the negative half cycle, i) keeping the third switch off and keeping the fourth switch on; and ii) controlling the first switch as the main switch and controlling the second switch as the sync switch; and when the totem pole PFC circuit works in DCM, i) turning off the sync switch when a current detecting signal indicative of an AC input current of the totem pole PFC circuit decreases to zero; ii) turning on the main switch at a valley of a switching voltage after expiry of a time delay started from when the AC input current of the totem pole PFC circuit decreases to zero; and iii) turning off the main switch and turning on the sync switch after the main switch is on for a second on-time period; wherein the switching voltage is a voltage at a connection node of the first switch and the second switch.

In one embodiment, The control method further comprising: when the totem pole PFC circuit works in CCM, i) turning on the main switch and turning off the sync switch when the current detecting signal indicative of the AC input current of the totem pole PFC circuit decreases to a current valley reference signal; and ii) turning off the main switch and turning on the sync switch after a first on-time period.

BRIEF DESCRIPTION OF THE DRAWINGS

The present invention can be further understood with reference to the following detailed description and the appended drawings.

DETAILED DESCRIPTION

In the present invention, numerous specific details are provided, such as examples of circuits, components, and methods, to provide a thorough understanding of embodiments of the present invention. Persons of ordinary skill in the art would recognize, however, that the invention can be practiced without one or more of the specific details. In other instances, well-known details are not shown or described to avoid obscuring aspects of the invention.

Figure 1:
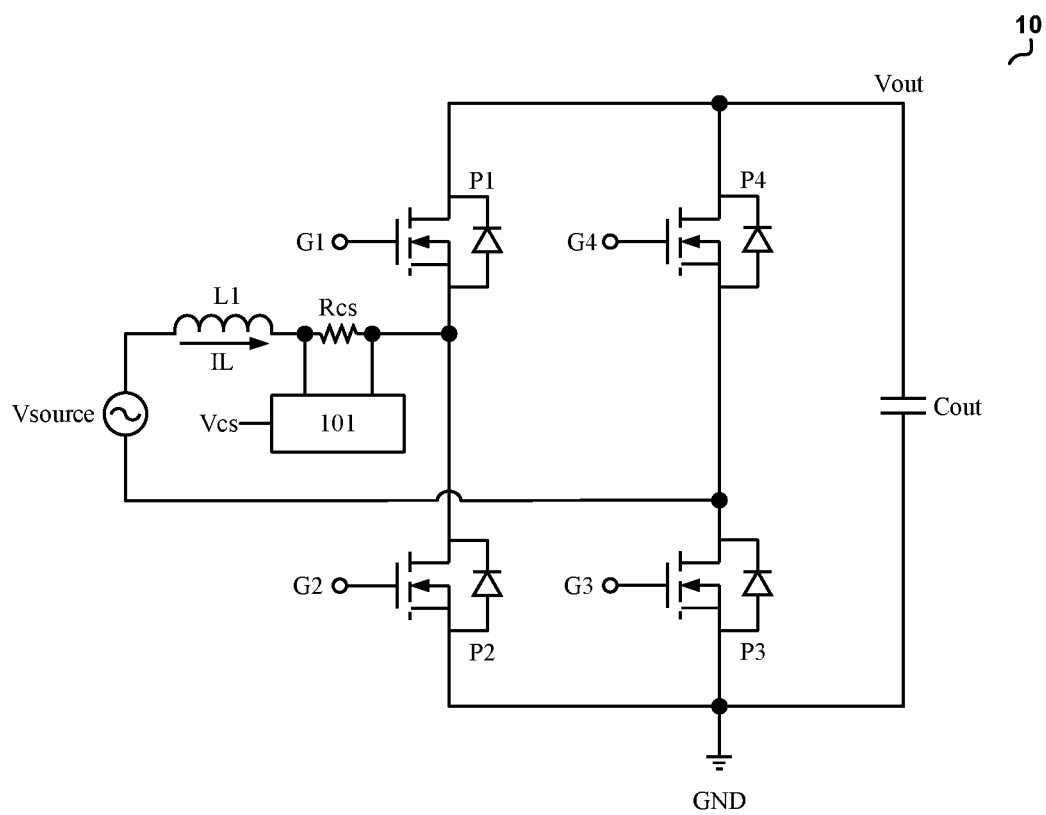
FIG. 1 shows a prior art totem pole PFC circuit 10.
Figure 2:
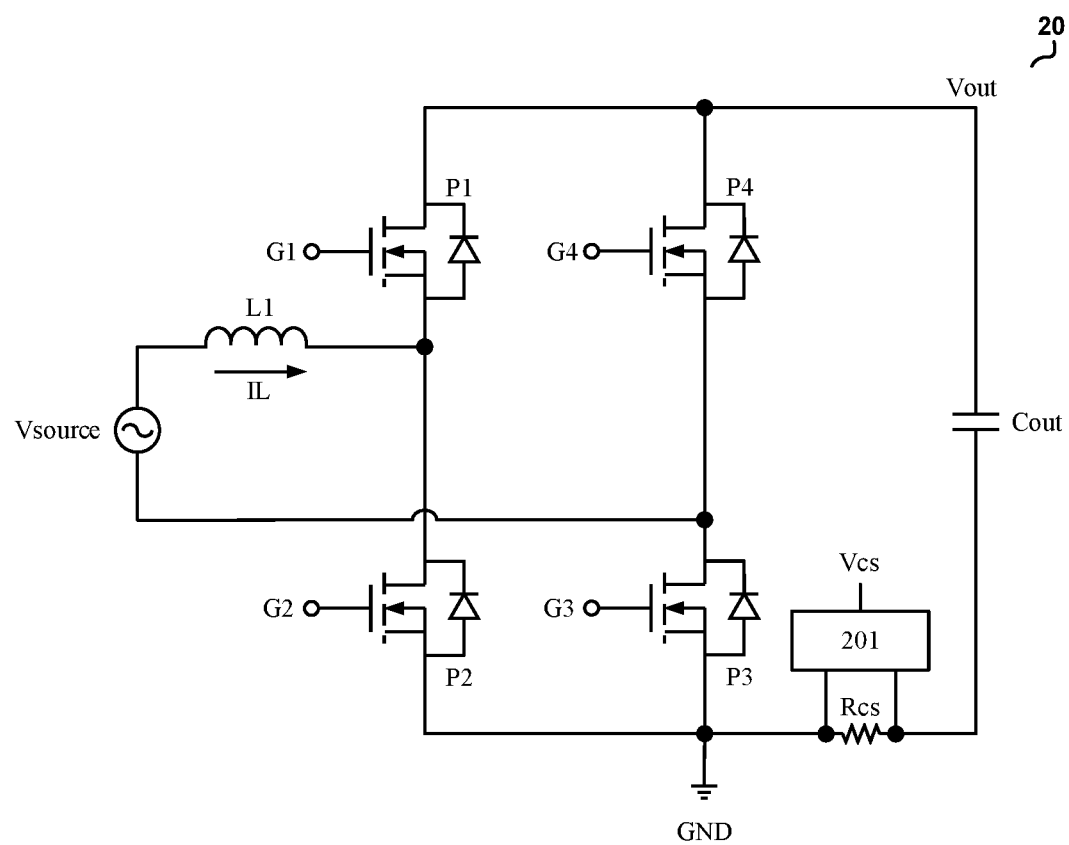
FIG. 2 shows a prior art totem pole PFC circuit 20.
Figure 3:
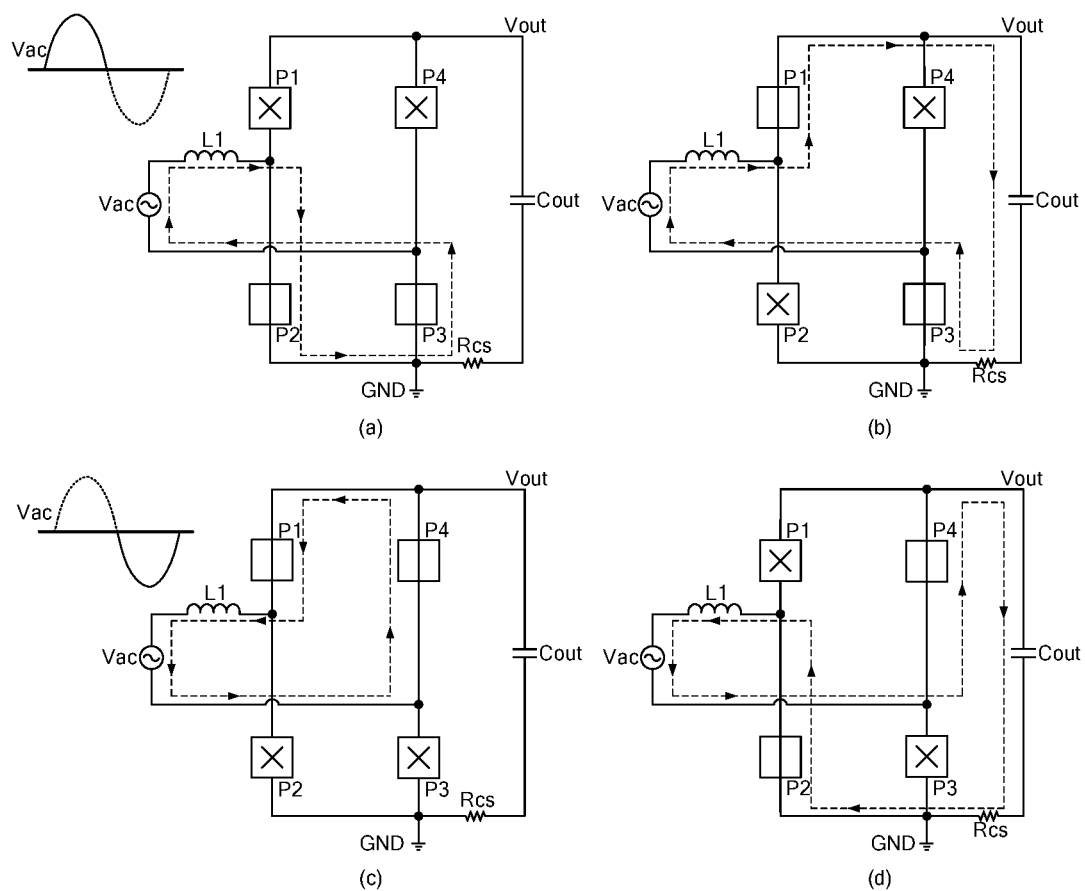
FIG. 3 shows states of switches P1-P4 when an AC power supply Vsource of the prior art totem pole PFC circuit is in the positive or negative half cycle.

In order to clarify the working principle of the circuit of the present invention, FIG. 3 shows the states of the switches P1-P4 in the positive half cycle and the negative half cycle of the AC power supply Vsource of the prior art totem pole PFC circuit. FIG. 3a and FIG. 3b show the states of the switches P1-P4 when the AC power supply Vsource provides a positive voltage, FIG. 3c and FIG. 3d show the states of switches P1-P4 when the AC power supply Vsource provides a negative voltage. In FIG. 3a and FIG. 3b, the fourth switch P4 keeps off, the third switch P3 keeps on, the second switch P2 is a main switch and the first switch P1 is a sync switch. In FIG. 3a, the second switch P2 is on, the first switch P1 is off, an inductor current IL increases gradually, and the current direction is Vsource→L1→P2→P3→Vsource. In FIG. 3b, the second switch P2 is off, the first switch P1 is on, the inductor current IL decreases gradually, and the current direction is Vsource→L1→P2→Cout→P3→Vsource. In FIG. 3c and FIG. 3d, the third switch P3 keeps off, the fourth switch P4 keeps on, the first switch P1 is the main switch, the second switch P2 is the sync switch. In FIG. 3c, the first switch P1 is on, the second switch P2 is off, the inductor current IL increases gradually and the current direction is Vsource→P4→P1→L1→Vsource. In FIG. 3d, the first switch P1 is off, the second switch P2 is on, the inductor current IL decreases gradually, and the current direction is Vsource→P4-Cout→P2→L1→Vsource.

Figure 4:
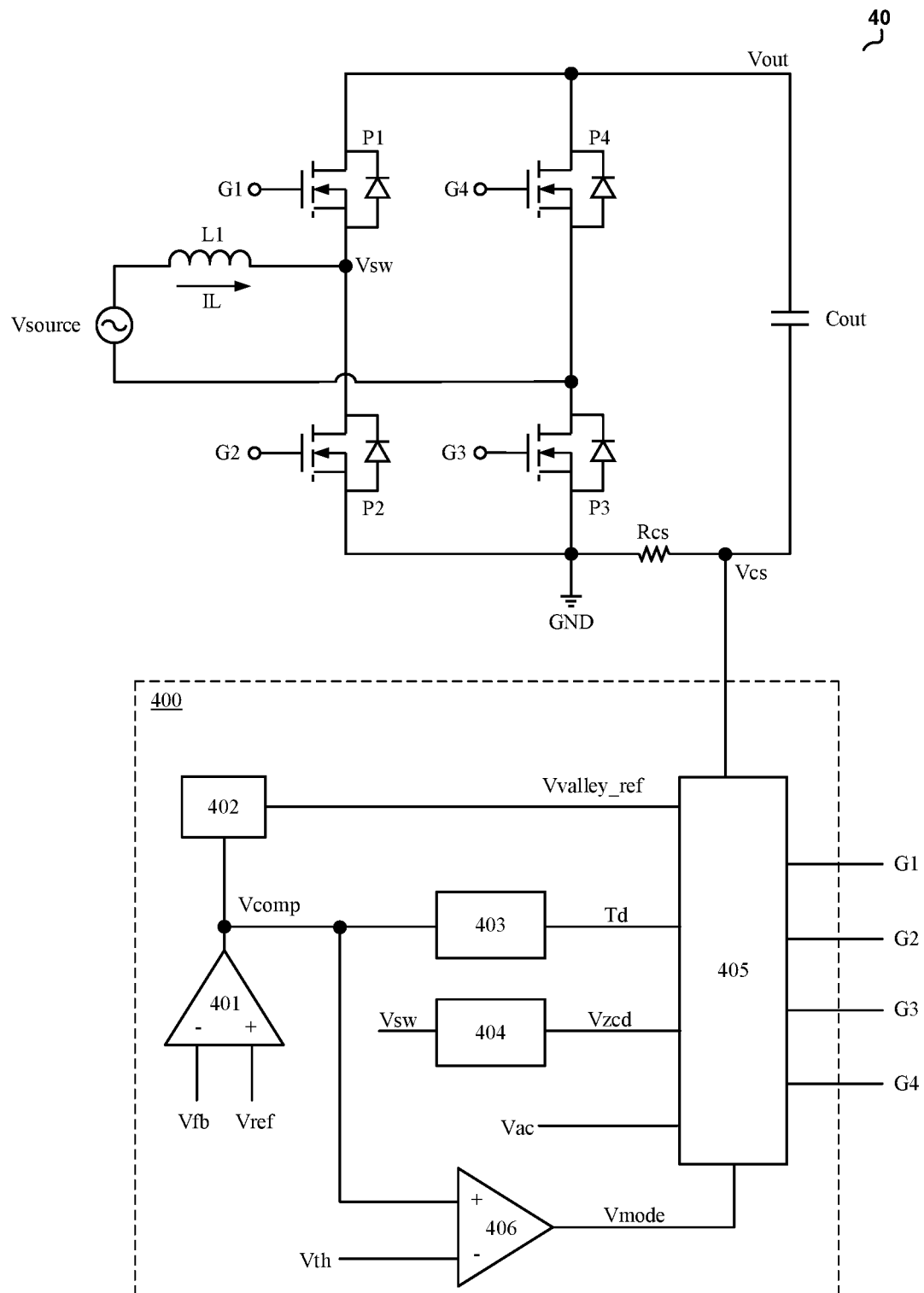
FIG. 4 schematically shows a totem pole PFC circuit 40 and a control circuit 400 in accordance with an embodiment of the present invention.

FIG. 4 schematically shows a totem pole PFC circuit 40 and a control circuit 400 in accordance with an embodiment of the present invention. The workflow of the control circuit 400 to control the totem pole PFC circuit 40 is shown in FIG. 3. In FIG. 4, the totem pole PFC circuit 40 comprises: the inductor L1, coupled to the AC power supply Vsource; the first switch P1, coupled between the inductor L1 and the output voltage Vout of the totem pole PFC circuit 40; the second switch P2, coupled between the inductor L1 and the ground reference GND of the totem pole PFC circuit 40; the third switch P3, coupled between the AC power supply Vsource and the ground reference GND; the fourth switch P4, coupled between the AC power supply Vsource and the output voltage Vout; the output capacitor Cout, coupled between the output voltage Vout and the ground reference GND; the detecting resistor Rcs, coupled between the output capacitor Cout and the ground reference GND; and the control circuit 400, configured to receive the current detecting signal Vcs across the detecting resistor Rcs and a feedback signal Vfb indicative of the output voltage Vout, and to provide a first control signal G1, a second control signal G2, a third control signal G3, and a fourth control signal G4 based on the current detecting signal Vcs and the feedback signal Vfb to control the first switch P1, the second switch P2, the third switch P3 and the fourth switch P4 respectively.

In the embodiment shown in FIG. 4, the control circuit 400 comprises: an error amplifying circuit 401, configured to receive the feedback signal Vfb and a feedback reference signal Vref, and to provide a feedback regulating signal Vcomp based on the feedback signal Vfb and the feedback reference signal Vref; a current valley reference generating circuit 402, configured to receive the feedback regulating signal Vcomp, and to provide a current valley reference signal Vvalley_ref based on the feedback regulating signal Vcomp; a delay circuit 403, configured to receive the feedback regulating signal Vcomp, and to provide a delay signal Td based on the feedback regulating signal Vcomp; a valley detection circuit 404, configured to receive a switching voltage Vsw and to provide a switching voltage valley detecting signal Vzcd based on the switching voltage Vsw, wherein the switching voltage Vsw is the voltage at a connection node of the first switch P1 and the second switch P2; and a control signal generating circuit 405, configured to receive the current detecting signal Vcs, the switching voltage valley detecting signal Vzcd, an AC voltage Vac and a mode determining signal Vmode, and to provide the control signals G1-G4 based on the current detecting signal Vcs, the current valley reference signal Vvalley_ref, the delay signal Td, the switching voltage valley detecting signal Vzcd, the AC voltage Vac and the mode determining signal Vmode.

In one embodiment, the error amplifier circuit 401 comprises an error amplifier. The error amplifier is configured to receive the feedback signal Vfb indicative of the output voltage Vout and the feedback reference signal Vref, and to provide the feedback regulating signal Vcomp based on the feedback signal Vfb and the feedback reference signal Vref. In practical applications, when the load increases, the feedback signal Vfb decreases, the feedback regulating signal Vcomp increases accordingly, and then the totem pole PFC circuit 40 provides more power to the load. When the load decreases, the feedback signal Vfb increases, the feedback regulating signal Vcomp decreases accordingly, and then the totem pole PFC circuit 40 provides less power to the load.

It could been known from the above illustration that the feedback regulating signal Vcomp is indicative of the load. In some embodiments of the present invention, the control circuit 400 further comprises a mode determining circuit 406 that configured to receive the feedback regulating signal Vcomp and a load threshold Vth, and to provide the mode determining signal Vmode based on a comparison result of the feedback regulating signal Vcomp and the load threshold Vth. When the feedback regulating signal Vcomp is larger than the load threshold Vth, the totem pole PFC circuit 40 works in CCM (Continuous Current Mode); when the feedback regulating signal Vcomp is smaller than the load threshold Vth, the totem pole PFC circuit 40 works in CRM (Critical Current Mode) or DCM (Discontinuous Current Mode). Persons of ordinary skill in the art may set the load threshold Vth based on the practical applications requirements. In some embodiments, the load threshold Vth is set by users through a data interface and is stored in a storage unit of the control circuit, such as registers. In some embodiments, the load threshold Vth is set by an external component or an external reference source through pins of the control circuit. In the embodiments of the present invention, CRM could be considered as a special DCM, the difference between CRM and DCM is that the time duration determined by the delay signal Td in DCM and CRM is different. Specifically, in CRM, the time duration determined by the delay signal Td is zero; in DCM, the time duration determined by the delay signal Td is greater than zero. It should be known that any conventional circuit for determining the load could be utilized to generate the mode determining signal Vmode.

Figure 5:
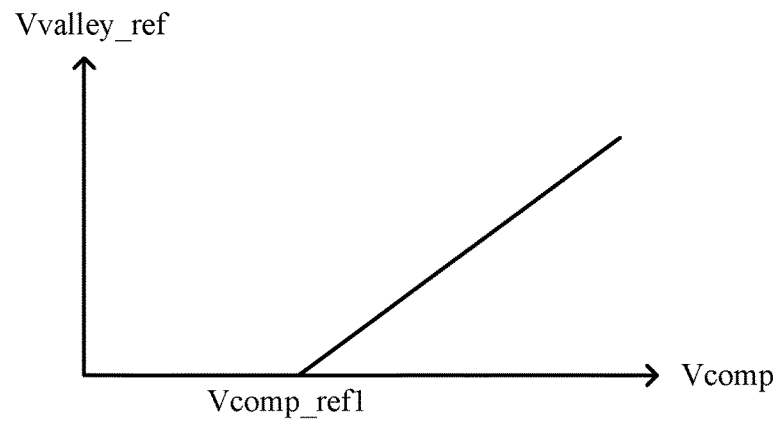
FIG. 5 schematically shows the relationship between a current valley reference signal Vvalley_ref and a feedback regulating signal Vcomp in accordance with an embodiment of the present invention.

In the embodiment shown in FIG. 4, the current valley reference generating circuit 402 generates the current valley signal Vvalley_ref based on the feedback regulating signal Vcomp. FIG. 5 shows the relationship of the current valley reference signal Vvalley_ref and the feedback regulating signal Vcomp, i.e., $Vvalley\_ref=(Vcomp-Vth) \times K1 \times |Vac|$, wherein Vvalley_ref>0. The minimum value of the current valley reference signal Vvalley_ref is zero, and the load threshold Vth is utilized to determine whether to enter CCM. In some embodiments, K1 is a constant and is greater than zero. In some embodiments, K1 relates to a peak voltage of the AC power supply Vsource, i.e., $K1=K2/Vac\_peak$, wherein K2 is a constant and is greater than zero, and Vac_peak is a peak value of the AC voltage Vac. In some embodiments, the current valley reference generating circuit 402 may be implemented by digital circuits. For example, persons of ordinary skill in the art could describe the relationship of the current valley reference signal Vvalley_ref and the feedback regulating signal Vcomp with VHDL (Very high-speed integrated circuit Hardware Description Language), Verilog and other digital description languages for generating the digital circuit automatically.

In the embodiment shown in FIG. 4, the delay circuit 403 receives the feedback regulating signal Vcomp, and provides the delay signal Td based on the feedback regulating signal Vcomp. In some embodiments, the delay signal Td represents a time duration inversely proportional to a value of the feedback regulating signal Vcomp, i.e., the larger the value of the feedback regulating signal, the shorter the time duration represented by the delay signal Td. In one embodiment, when the control circuit 400 works in CRM, the time duration represented by the delay signal Td is zero. When the control circuit 400 works in DCM, the time duration represented by the delay signal Td increases as the feedback regulating signal Vcomp decreases. Persons of ordinary skill in the art may determine the relationship between the delay signal Td and the feedback regulating signal Vcomp based on the requirements of the practical applications.

When the totem pole PFC circuit works in DCM, the switching voltage Vsw rings after the first switch P1 and the second switch P2 are both turned off. In the embodiment shown in FIG. 4, the valley detection circuit 404 receives the switching voltage Vsw, and provides the switching voltage valley detecting signal Vzcd for indicating the valley point of the switching voltage Vsw. The switching voltage Vsw is a voltage at the connection point of the first switch P1 and the second switch P2. In some embodiments, during the positive half cycle of the AC voltage Vac, when the first switch P1 is turned off, the switching voltage Vsw rings after decreasing to the valley from the output voltage Vout. The switching voltage valley detecting signal Vzcd has a pulse each time when the switching voltage Vsw rings to valley. During the negative half cycle of the AC voltage Vac, when the second switch P2 is turned off, the switching voltage Vsw rings after increasing to peak from the zero voltage of the ground reference GND. The switching voltage valley detecting signal Vzcd has a pulse each time when the switching voltage Vsw rings to peak. In other words, in positive half cycle of the AC voltage Vac, the valley value of the ringing switching voltage Vsw is detected, and in negative half cycle of the AC voltage Vac, the peak value of the ringing switching voltage Vsw is detected. Any conventional circuit for detecting the valley value or the peak value of a ringing voltage could be used in this invention.

In one embodiment, the control signal generating circuit 405 receives the AC voltage Vac, and generates the control signals G3 and G4 based on the AC voltage Vac. In one embodiment, in the positive half cycle of the AC voltage Vac, the third switch P3 is turned on by the third control signal G3, the fourth switch P4 is turned off by the fourth control signal G4. In the negative half cycle of the AC voltage Vac, the third switch P3 is turned off by the third control signal G3, the fourth switch P4 is turned on by the fourth control signal G4. It should be understood that, the AC voltage Vac provided to the control signal generating circuit 405 may equal to the actual voltage of the AC power source Vsource, or may be partial of the actual voltage of the AC power source Vsource for meeting the input voltage range requirement of the control signal generating circuit 405.

In one embodiment, the control signal generating circuit 405 is implemented with digital circuits. The working principle of the control signal generating circuit 405 could be described with VHDL, Verilog and other digital languages for generating the corresponding digital circuit automatically.

Figure 6:
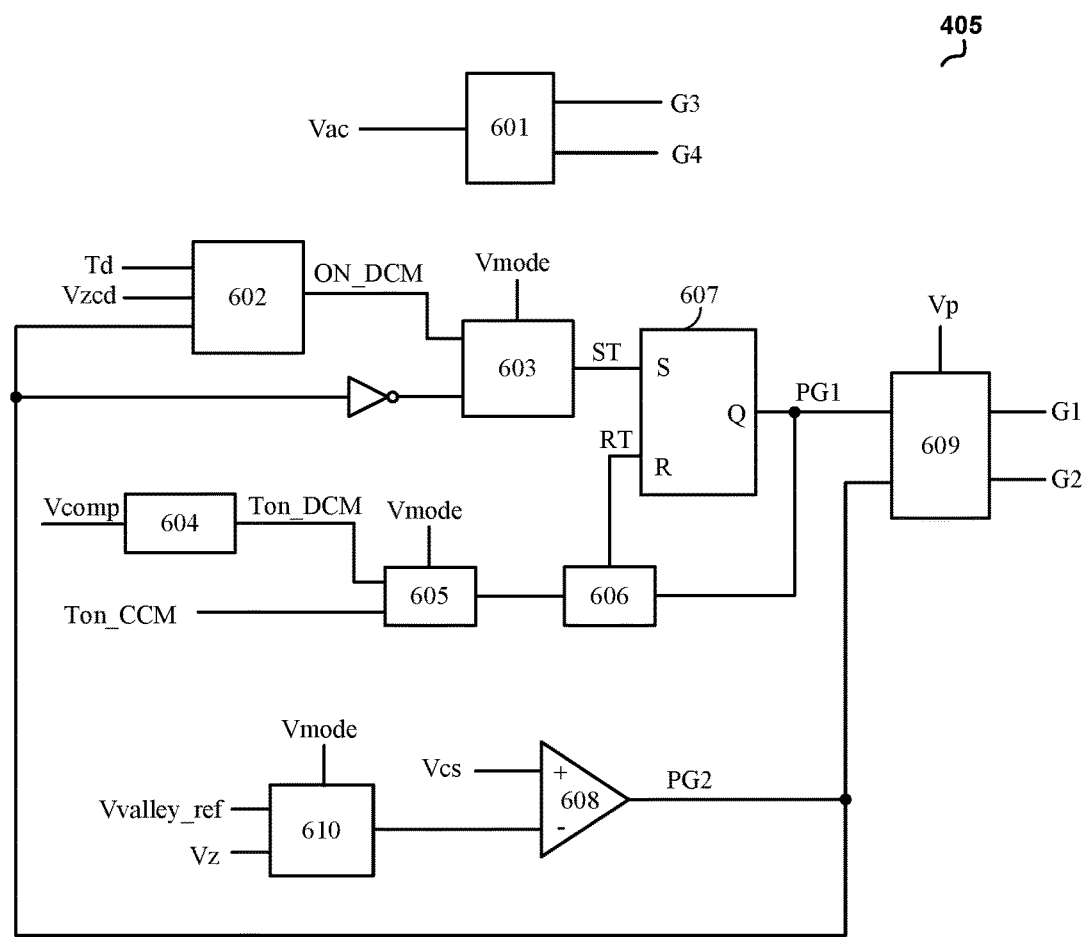
FIG. 6 schematically shows a control signal generating circuit 405 in accordance with an embodiment of the present invention.

FIG. 6 schematically shows the control signal generating circuit 405 in accordance with an embodiment of the present invention. As shown in FIG. 6, the control signal generating circuit 405 comprises: an AC voltage detecting circuit 601, configured to receive the AC voltage Vac, a positive voltage threshold Vzero and a negative voltage threshold −Vzero, and to provide the third control signal G3 and the fourth control signal G4 based on the AC voltage Vac; a logic circuit 602, configured to receive the delay signal Td, the switching voltage valley detecting signal Vzcd and a current valley detecting signal PG2, and to provide a DCM on-time signal ON_DCM based thereon, wherein after the time duration determined by the delay signal Td from when the current valley detecting signal PG2 indicates that the value of the inductor current IL decreases to zero or the current valley reference signal Vvalley_ref, the switching voltage valley detecting signal Vzcd has a pulse; a first selecting circuit 603, configured to receive the DCM on-time signal ON_DCM, the current valley detecting signal PG2 and the mode determining signal Vmode, wherein when the mode determining signal Vmode indicates that the totem pole PFC circuit is in CCM, the first selecting circuit 603 provides the current valley detecting signal PG2 as a set signal ST, otherwise, the first selecting circuit 603 provides the DCM on-time signal ON_DCM as the set signal ST; a DCM on-time generating circuit 604, configured to receive the feedback regulating signal Vcomp and to provide a DCM on-time signal Ton_DCM, wherein DCM has a value proportional to the value of the feedback regulating signal Vcomp; a second selecting circuit 605, configured to receive the DCM on-time signal Ton_DCM, a CCM on-time signal Ton_CCM and the mode determining signal Vmode, wherein when the mode determining signal Vmode indicates that the totem pole PFC circuit is in CCM, the second selecting circuit 605 provides the CCM on-time signal Ton_CCM, otherwise, the second selecting circuit 605 provides the DCM on-time signal Ton_DCM; a timing circuit 606, configured to receive a pre-control signal PG1 and an output signal of the second selecting circuit 605, and to provide a reset signal RT based on the pre-control signal PG1 and the output signal of the second selecting circuit 605; a RS flip-flop 607, has a set terminal "S" that is configured to receive the set signal ST from the first selecting circuit 603, a reset terminal "R" that is configured to receive the reset signal RT and an output terminal "Q" that is configured to provide the pre-control signal PG1; a third selecting circuit 610, configured to receive a zero current threshold Vz, the current valley reference signal Vvalley_ref and the mode determining signal Vmode, wherein when the mode determining signal Vmode indicates that the totem pole PFC circuit is in CCM, the third selecting circuit 610 provides the current valley reference signal Vvalley_ref, otherwise, the third selecting circuit 610 provides the zero current threshold Vz; a valley current detecting circuit 608, configured to receive the current detecting signal Vcs and an output signal of the third selecting circuit 610, and to provide the current valley detecting signal PG2 based on the comparison result of the current detecting signal Vcs and the output signal of the third selecting circuit 610; and a fourth selecting circuit 609, configured to receive the pre-control signal PG1, the current valley detecting signal PG2 and an AC voltage determining signal Vp, wherein when the AC voltage determining signal Vp indicates that the AC voltage Vac is in the positive half cycle, the fourth selecting circuit 609 provides the current valley detecting signal PG2 as the first control signal G1 and provides the pre-control signal PG1 as the second control signal G2, and when the AC voltage determining signal Vp indicates that the AC voltage Vac is in the negative half cycle, the fourth selecting circuit 609 provides the pre-control signal PG1 as the first control signal G1, and provides the current valley characterizing PG2 as the second control signal G2. The AC voltage determining signal Vp may be the third control signal G3 or the fourth control signal G4. It should be understood that, any signal could distinguish the positive half cycle and the negative half cycle of the AC voltage Vac may be utilized as the AC voltage determining signal Vp in the present invention.

The AC voltage detecting circuit 601 comprises any conventional circuit for distinguishing the positive and negative half cycles of the AC voltage. In one embodiment, when the AC voltage Vac is higher than the positive voltage threshold Vzero, the AC voltage detecting circuit 601 provides the third control signal G3 with high logic state to turn on the third switch P3, and provides the forth control signal G4 with low logic state to turn off the fourth switch P4. When the AC voltage Vac is lower than the negative voltage threshold −Vzero, the AC voltage detecting circuit 601 provides the third control signal G3 with low logic state to turn off the third switch P3, and provides the forth control signal G4 with high logic state to turn on the fourth switch P4. When the AC voltage Vac is between the positive voltage threshold Vzero and the negative voltage threshold −Vzero, the third control signal G3 and the forth control signal G4 are both logic low, i.e., the third switch P3 and the forth switch P4 are both off. In one embodiment, the control signal generating circuit 405 further comprises logic gates, configured to turn off the first switch P1 and the second switch P2 when the third switch P3 and the fourth switch P4 are both off.

In one embodiment, the logic circuit 602 comprises a pulse circuit enabled by the delay signal Td. Specifically, the pulse circuit is enabled after a time duration from when the current detecting signal Vcs decreases to zero, wherein the time duration is determined by the delay signal Td. When the switching voltage valley detecting signal Vzcd at the input terminal of the pulse circuit has a pulse, the pulse circuit provides a pulse at the output terminal, i.e. the DCM on-time signal ON_DCM.

In one embodiment, the DCM on-time generating circuit 604 comprises a calculating circuit. The calculating circuit multiplies the feedback regulating signal Vcomp by a constant to obtain the DCM on-time signal Ton_DCM. Thus the DCM on-time signal Ton_DCM represents a time period having a length proportional to the value of the feedback regulating signal Vcomp.

In the embodiments of the present invention, the value of the CCM on-time signal Ton_CCM is fixed and is set by users. The value of the CCM on-time signal Ton_CCM is determined by inductor parameters, the required output voltage ripple and the working frequency of the circuit in applications. Persons of ordinary skill in the art could set the CCM on-time signal Ton_CCM based on the specs of the application from experience.

In one embodiment, the timing circuit 606 receives the output signals of the second selecting circuit 605 and the pre-control signal PG1, wherein the timing circuit 606 starts timing when the pre-control signal PG1 changes from logic low to logic high. In CCM, the timing circuit 606 provides the reset signal RT to reset the RS flip-flop 607 at the end of the timing, which is determined by the CCM on-time signal Ton_CCM. In DCM or CRM, the timing circuit 606 provides the reset signal RT to reset the RS flip-flop 607 at the end time of the timing, the end time of the timing is determined by the DCM on-time signal Ton_DCM.

In one embodiment, the third selecting circuit 610 provides the current valley reference signal Vvalley_ref when the mode determining signal Vmode indicates that the totem pole PFC circuit 40 works in CCM, otherwise, the third selecting circuit 610 provides the zero current threshold Vz. In CCM, the valley current detecting circuit 608 compares the current detecting signal Vcs with the current valley reference signal Vvalley_ref. When the current detecting signal Vcs decreases to the current valley reference signal Vvalley_ref, the current valley detecting signal PG2 changes from logic high to logic low. In DCM or CRM, the valley current detecting circuit 608 compares the current detecting signal Vcs with the zero current threshold Vz. When the current detecting signal Vcs decreases to the zero current threshold Vz, the valley characterized signal PG2 changes from logic high to logic low.

Figure 7:
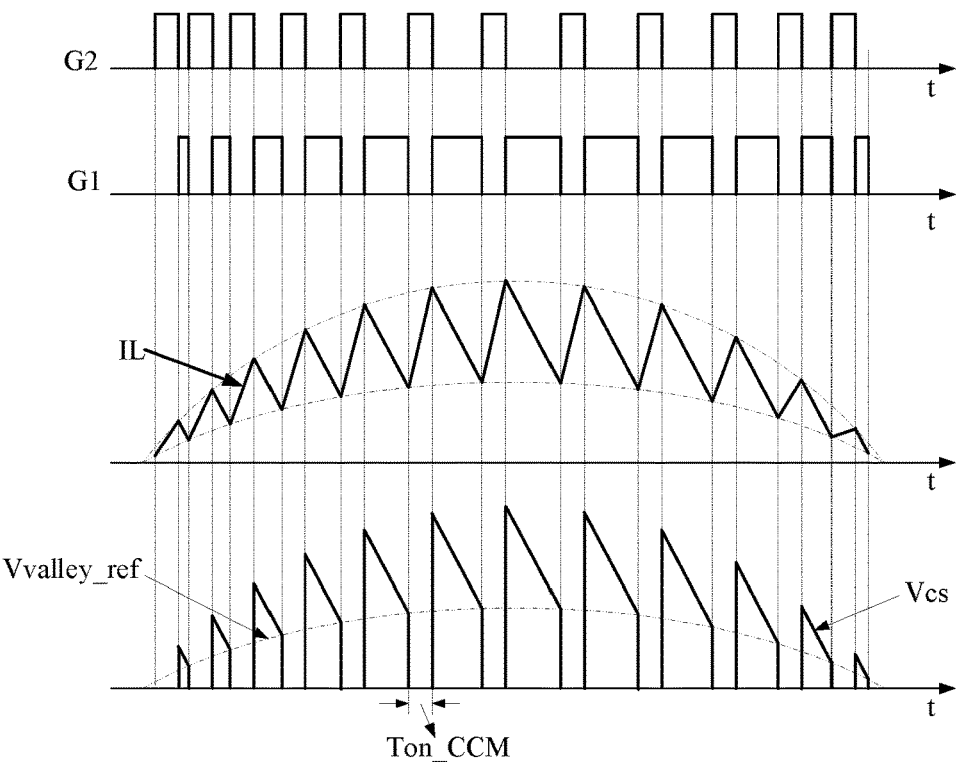
FIG. 7 schematically shows the waveforms of control signals G1 and G2, an inductor current IL and the current valley reference signal Vvalley_ref when the control circuit 400 is in CCM (continuous current mode) in accordance with an embodiment of the present invention.

FIG. 7 shows waveforms of the first control signal G1, the second control signal G2, the inductor current IL and the current valley reference signal Vvalley_ref when the totem pole PFC circuit 40 works in CCM, in accordance with an embodiment of the present invention. Since the control circuit 400 operates similarly in the positive and negative half cycles of the AC voltage Vac, only signal waveforms of the control circuit 400 in the positive half cycle of the AC voltage Vac is shown in FIG. 7. The operation of the control circuit 400 is illustrated with reference to FIG. 6 and FIG. 7. As mention above, in the positive half cycle of the AC voltage Vac, the third switch P3 keeps on, and the fourth switch P4 keeps off. In FIG. 7, each switch is turned off by a logic low control signal, and is turned on by a logic high control signal. When the first control signal G1 is logic low and the second control signal G2 is logic high, the first switch P1 is off, and the second switch P2 is on, then the inductor current IL increases. Since no inductor current IL flows through the detector resistor Rcs, the value of the current detecting signal Vcs is zero. When the time duration determined by the CCM on-time signal Ton_CCM ends, the RS flip-flop 607 is reset by the reset signal RT, and the pre-control signal PG1 flips to logic low. Then the logic low pre-control signal PG1 is selected by the fourth selecting circuit 609 to be the second control signal G2 to turn off the second switch P2. After that, the inductor current IL flows through a body diode of the first switch P1 and the detecting resistor Rcs. As a result, the inductor current detecting signal Vcs is larger than the current valley reference signal Vvalley_ref, and the current valley detecting signal PG2 flips to logic high accordingly. The fourth selecting circuit 609 selects the logic high current valley detecting signal PG2 as the first control signal G1 to turn on the first switch P1, the inductor current IL and the current detecting signal Vcs decrease accordingly. When the current detecting signal Vcs decreases to the current valley reference signal Vvalley_ref, the current valley detecting signal PG2 flips to logic low, and then the first switch P1 is turned off by the first control signal G1. The RS flip-flop 607 is set by an inverted signal of the current valley detecting signal PG2 to provide a logic high pre-control signal PG1. The logic high pre-control signal PG1 is then selected by the fourth selecting circuit 609 as the second control signal G2 to turn on the switch P2, and the operation repeats.

Figure 8:
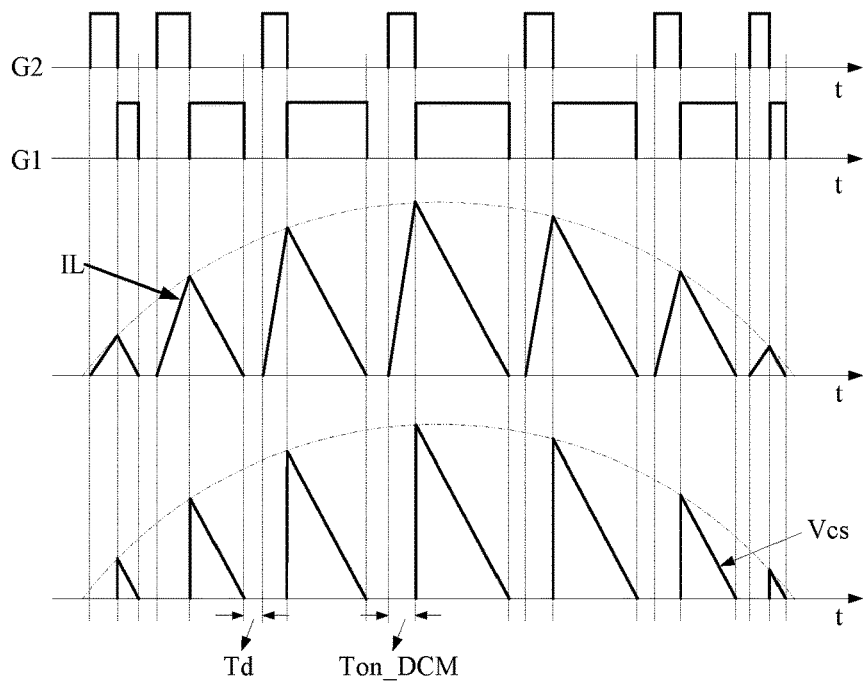
FIG. 8 schematically shows the waveforms of control signals G1 and G2, the inductor current IL and the current valley reference signal Vvalley_ref when the control circuit 400 is in DCM (Discontinuous Current Mode) in accordance with an embodiment of the present invention.

FIG. 8 shows waveforms of the first control signal G1, the second control signal G2, the inductor current IL and the current valley reference signal Vvalley_ref when the totem pole PFC circuit 40 works in DCM, in accordance with an embodiment of the present invention. Since the control circuit 400 operates similarly in the positive and negative half cycles of the AC voltage Vac, only the signal waveforms of the control circuit 400 in the positive half cycle of the AC voltage Vac is shown in FIG. 8. The operation of the control circuit 400 is illustrated with reference to FIG. 6 and FIG. 8. As mention above, in the positive half cycle of the AC voltage Vac, the third switch P3 keeps on, the fourth switch P4 keeps off. In FIG. 8, each switch is turned off by a logic low control signal, and is turned on by a logic high control signal. When the first control signal G1 is logic low and the second control signal G2 is logic high, the first switch P1 is off, and the second switch P2 is on. Then the inductor current IL increases. When the time duration determined by the DCM on-time signal Ton_DCM ends, the RS flip-flop 607 is reset by the reset signal RT, and the pre-control signal PG1 flips to logic low. Then the logic low pre-control signal PG1 is selected by the fourth selecting circuit 609 as the second control signal G2 to turn off the second switch P2. Then the inductor current IL flows through a body diode of the first switch P1 and the detecting resistor Rcs. As a result, the current detecting signal Vcs is larger than the current valley reference signal Vvalley_ref, and the current valley detecting signal PG2 flips to logic high accordingly. The fourth selecting circuit 609 selects the logic high current valley detecting signal PG2 as the first control signal G1 to turn on the first switch P1, the inductor current IL and the current detecting signal Vcs decrease accordingly. When the inductor current IL decreases to zero, the current valley detecting signal PG2 is selected by the fourth selecting circuit 609 as the first control signal G1 to turn on the first switch P1. When the time duration determined by the delay signal Td ends and the valley detecting signal Vzcd provides a pulse, the logic circuit 602 provides the DCM mode on-time signal ON_DCM. The RS flip-flop 607 is set by the first selecting circuit 603 to provide a logic high pre-control signal PG1. Then the PG1 is selected by the fourth selecting circuit 609 as the second control signal G2 to turn on the second switch P2. Since no inductor current IL flows through the detector resistor Rcs, the value of the current detecting signal Vcs is zero, the current valley detecting signal PG2 is logic low, i.e., the first control signal G1 keeps logic low, the first switch P1 keeps off, the inductor current IL increases, and the operation repeats.

In some embodiments, the delay signal Td represents the time duration and inversely proportional to the value of the feedback regulating signal Vcomp, i.e., the larger the value of the feedback regulating signal, the shorter the time duration represented by the delay signal Td. When the control circuit 400 works in CRM, the time duration represented by the delay signal Td is zero. When the control circuit 400 works in DCM, the time duration represented by the delay signal Td increases as the feedback regulating signal Vcomp decreases.

Figure 9:
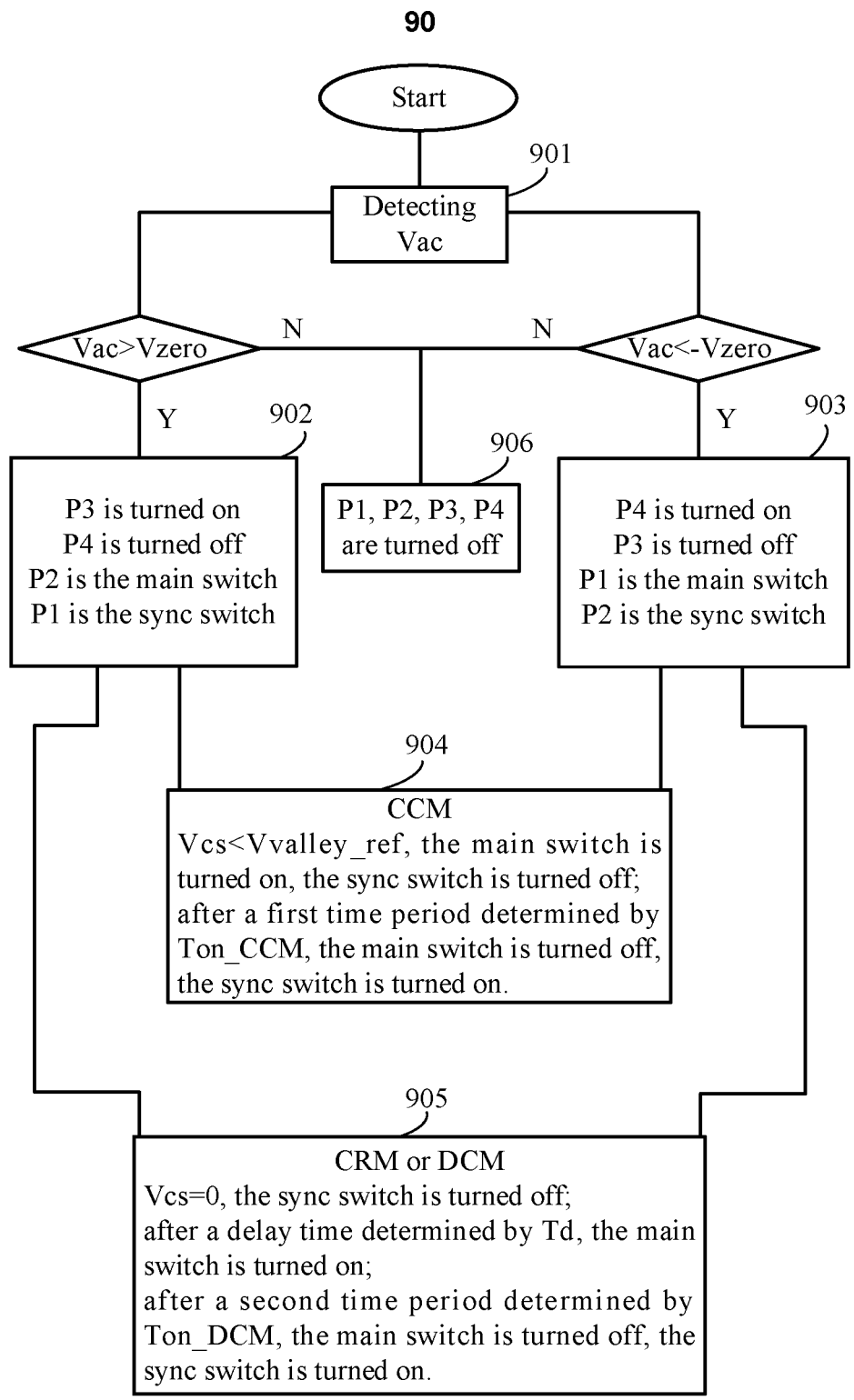
FIG. 9 schematically shows the workflow 90 of the control signal generating circuit 405 in accordance with an embodiment of the present invention.

FIG. 9 shows a work flow 90 of the control signal generating circuit 405 used with the totem pole PFC circuit in accordance with an embodiment of the present invention. The work flow 90 comprises:

Step 901, determining whether the AC input voltage of the totem pole PFC circuit is in the positive half cycle or in the negative half cycle, i.e., comparing the AC voltage Vac with the positive voltage threshold Vzero and the negative voltage threshold −Vzero. When the AC voltage Vac is higher than the positive voltage threshold Vzero, the AC voltage is determined to be in the positive half cycle; when the AC voltage Vac is lower than the negative voltage threshold −Vzero, the AC voltage is determined to be in the negative half cycle. In one embodiment, the positive voltage threshold Vzero may be close to but higher than zero. Similarly, the negative voltage threshold −Vzero may be close to but lower than zero. The positive voltage threshold Vzero and the negative voltage threshold −Vzero set a dead-time for the switches P3 and P4 near a zero crossing point of the AC voltage Vac to prevent a short-circuit risk.

Step 902, in the positive half cycle of the AC voltage Vac, i) keeping the third switch P3 on and keeping the fourth switch P4 off; and ii) controlling the second switch P2 as the main switch and controlling the first switch P1 as the sync switch.

Step 903, in the negative half cycle of the AC voltage Vac, i) keeping the third switch P3 off and keeping the fourth switch P4 on; and ii) controlling the first switch P1 as the main switch and controlling the second switch P2 as the sync switch.

Step 904, when the totem pole PFC circuit 40 works in CCM (working mode is determined by the mode determining signal Vmode), i) turning on the main switch and turning off the sync switch when the current detecting signal Vcs indicative of the AC input current of the totem pole PFC circuit decreases to the current valley reference signal Vvalley_ref; and ii) turning off the main switch and turning on the sync switch after a first on-time period determined by the CCM on-time signal Ton_CCM. When the current detecting signal Vcs decreases to the valley reference signal Vvalley_ref again, the operation repeats.

Step 905, when the totem pole PFC circuit 40 works in CRM or DCM (the working mode is determined by the mode determining signal Vmode), i) turning off the sync switch when the current detecting signal Vcs indicative of the AC input current of the totem pole PFC circuit decreases to zero; ii) turning on the main switch at the valley of the switching voltage after expiry of the time delay started from when the AC input current of the totem pole PFC circuit decreases to zero; and iii) turning off the main switch and turning on the sync switch after the main switch is on for a second on-time period determined by the DCM on-time signal Ton_DCM. When the AC input current of the totem pole PFC circuit decreases to zero again, the operation repeats.

Step 906, when the AC voltage Vac near a zero-crossing point, which means the absolute value |Vac| of the AC voltage Vac is lower than or equal to Vzero, all switches P1-P4 are turned off.

It should be known that the steps of the aforementioned workflow 90 is not necessarily to be performed in order. As long as the condition of the corresponding step is met, the corresponding step is performed.

It should be known that the control signal generating circuit 405 in FIG. 6 is illustrated as an example of the present invention. Persons of ordinary skill in the art may design the control signal generating circuit in the light of the workflow 90 in FIG. 9. In some embodiments, digital description languages such as Verilog and VHDL are used to describe the workflow 90 shown in FIG. 9, thereby generating digital circuits automatically to realize the functions of the control signal generating circuit 405.

It should be known that the relationship between the logic state of the control signal and the corresponding switch status is decided by the type of the switch. Specifically, when the switch is an N-type MOSFET (Metal Oxide Semiconductor Field Effect Transistor), it is turned on when the control signal is logic high and is turned off when the control signal is logic low. In the contrary, when the switch is a P-type MOSFET, it is turned off when the control signal is logic high and is turned on when the control signal is logic low. The relationship between the logic state of the control signal and the corresponding switch status in the embodiment of the present invention is just for illustration, and may be realized in other way.

It should be understood, the circuit and the workflow given in the present invention are just for schematic illustration. Any circuit can realize the function and operation of the present invention does not depart from the spirit and the scope of the invention. For example, in some embodiment, the workflow of the aforementioned control circuit 400 of the present invention can be described in detail through the digital description language, thereby generating digital circuits automatically to realize the functions of the control circuit 400.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously would be resorted to by those skilled in the art without departing from the spirit and the scope of the invention as hereinafter defined by the appended claims as only a preferred embodiment(s) thereof has been disclosed.

What is claimed is:

1. A totem pole PFC (Power Factor Correction) circuit, comprising:
   a first switch and a second switch coupled in series between an output voltage of the totem pole PFC circuit and a ground reference; and
   a control circuit configured to: i) when the totem pole PFC circuit works in CCM (Continuous Current Mode), turn on a main switch when a current detecting signal indicative of an AC input current of the totem pole PFC circuit decreases to a current valley reference signal, and keep the main switch ON for a first on-time period; and ii) when the totem pole PFC circuit works in DCM (Discontinuous Current Mode), turn on the main switch at a valley of a switching voltage after expiry of a time delay started from when the AC input current decreases to zero, and keep the main switch ON for a second on-time period;
   wherein the switching voltage is a voltage at a connection node of the first switch and the second switch, and
   wherein the second switch is the main switch when an AC input voltage of the totem pole PFC is in a positive half cycle, and the first switch is the main switch when the AC input voltage is in a negative half cycle.

2. The totem pole PFC circuit of claim 1, further comprising:
an inductor, coupled between an AC power supply and the connection node of the first switch and the second switch.

3. The totem pole PFC circuit of claim 1, further comprising:
a third switch and a fourth switch coupled in series between the output voltage of the totem pole PFC circuit and the ground reference, wherein:
when the AC input voltage is in the positive half cycle, the third switch keeps ON and the fourth switch keeps OFF; and
when the AC input voltage is in the negative half cycle, the fourth switch keeps ON and the third switch keeps OFF.

4. The totem pole PFC circuit of claim 3, wherein the control circuit comprises:
an AC voltage detecting circuit, configured to receive the AC input voltage, a positive voltage threshold and a negative voltage threshold, wherein based on a comparison result of the AC input voltage and the positive voltage threshold, and a comparison result of the AC input voltage and the negative voltage threshold, the AC voltage detecting circuit provides a third control signal to control the third switch, and a fourth control signal to control the fourth switch.

5. The totem pole PFC circuit of claim 1, wherein the control circuit comprises:
a DCM on-time generating circuit, configured to receive a feedback regulating signal indicative of a load of the totem pole PFC circuit, and to provide a DCM on-time signal based on the feedback regulating signal, wherein the DCM on-time signal determines the second on-time period.

6. The totem pole PFC circuit of claim 5, wherein the control circuit further comprises:
a selecting circuit, configured to receive the DCM on-time signal, a CCM on-time signal and a mode determining signal, wherein when the mode determining signal indicates that the totem pole PFC circuit works in CCM, the selecting circuit provides the CCM on-time signal as an output signal, otherwise, the selecting circuit provides the DCM on-time signal as the output signal; and
a timing circuit, configured to receive a pre-control signal and the output signal of the selecting circuit, and to provide a reset signal for controlling an on-time of the main switch based on the pre-control signal and the output signal of the selecting circuit, wherein the pre-control signal indicates a turn on-time of the main switch.

7. The totem pole PFC circuit of claim 1, wherein the control circuit comprises:
a selecting circuit, configured to receive a zero current threshold, the current valley reference signal and the mode determining signal, wherein when the mode determining signal indicates that the totem pole PFC circuit works in CCM, the selecting circuit provides the current valley reference signal as an output signal, otherwise, the selecting circuit provides the zero current threshold as the output signal; and
a valley current detecting circuit, configured to receive the current detecting signal and the output signal of the selecting circuit, and to provide a current valley detecting signal based on the current detecting signal and the output signal of the selecting circuit;
wherein when the totem pole PFC circuit works in CCM, the current valley detecting signal turns on the main switch when the current detecting signal decreases to the output signal of the selecting circuit.

8. The totem pole PFC circuit of claim 7, wherein the control circuit further comprises:
a logic circuit, configured to receive a delay signal, a switching voltage valley detecting signal and the current valley detecting signal, and to provide the DCM on-time signal based on the delay signal, the switching voltage valley detecting signal and the current valley detecting signal, wherein after expiry of a time delay determined by the delay signal from when the current valley detecting signal indicates that the inductor current decreases to the zero current threshold, the logic circuit provides the DCM on-time signal to turn on the main switch when the totem pole PFC circuit works in DCM.

9. The totem pole PFC circuit of claim 8, wherein the control circuit comprises:
an error amplifying circuit, configured to receive a feedback reference signal and a feedback signal indicative of the output voltage of the totem pole PFC circuit, and to provide the feedback regulating signal based on the feedback reference signal and the feedback signal; and
a delay circuit, configured to receive the feedback regulating signal, and to provide the delay signal based on the feedback regulating signal.

10. The totem pole PFC circuit of claim 1, wherein the control circuit comprises:
a valley detection circuit, configured to receive the switching voltage, and to provide the switching voltage valley detecting signal based on the switching voltage, for indicating the valleys of the switching voltage.

11. The totem pole PFC circuit of claim 1, wherein the control circuit comprises:
a current valley reference generating circuit, configured to receive the feedback regulating signal, and to provide the current valley reference signal based on the feedback regulating signal.

12. A control method of a totem pole PFC (Power Factor Correction) circuit having a first switch and a second switch coupled in series between an output voltage and a ground reference, and having a third switch and a fourth switch coupled in series between the output voltage and the ground reference, the control method comprising:
when the totem pole PFC circuit works in CCM (Continuous Current Mode), turning on a main switch when a current detecting signal indicative of an AC input current of the totem pole PFC circuit decreases to a current valley reference signal, and keeping the main switch ON for a first on-time period; and
when the totem pole PFC circuit works in DCM (Discontinuous Current Mode), turning on the main switch at a valley of a switching voltage after expiry of a time delay started from when the AC input current of the totem pole PFC circuit decreases to zero, and keeping the main switch ON for a second on-time period;
wherein the switching voltage is a voltage at a connection node of the first switch and the second switch, and wherein the second switch is the main switch when an AC input voltage of the totem pole PFC is in a positive half cycle, and the first switch is the main switch when the AC input voltage is in a negative half cycle.

13. The control method of claim 12, further comprising:
turning off a sync switch when the current detecting signal decreases to the current valley reference signal when the totem pole PFC circuit works in CCM; and
turning off the sync switch when the current detecting signal decreases to a zero current threshold when the totem pole PFC circuit works in DCM;
wherein the first switch is the sync switch when the AC input voltage of the totem pole PFC is in the positive half cycle, and the second switch is the sync switch when the AC input voltage is in the negative half cycle.

14. The control method of claim 12, further comprising:
determining the AC input voltage is in the positive half cycle when the AC input voltage is higher than a positive voltage threshold; and
determining the AC input voltage is in the negative half cycle when the AC input voltage is lower than a negative voltage threshold;
wherein the positive voltage threshold is close to but higher than zero, and the negative voltage threshold is close to but lower than zero.

15. The control method of claim 12, wherein the second on-time period is generated based on a load of the totem pole PFC circuit.

16. The control method of claim 12, wherein the time delay is generated based on a load of the totem pole PFC circuit.

17. The control method of claim 12, wherein the current valley reference signal increases as a load of the totem pole PFC circuit increases.

18. A control method of a totem pole PFC circuit having a first switch and a second switch coupled in series between an output voltage and a ground reference, and having a third switch and a fourth switch coupled in series between the output voltage and the ground reference, the control method comprising:
determining whether an AC input voltage of the totem pole PFC circuit is in a positive half cycle or in a negative half cycle;
when the AC input voltage is in the positive half cycle, i) keeping the third switch on and keeping the fourth switch off; and ii) controlling the second switch as a main switch and controlling the first switch as a sync switch;
when the AC input voltage is in the negative half cycle, i) keeping the third switch off and keeping the fourth switch on; and ii) controlling the first switch as the main switch and controlling the second switch as the sync switch; and
when the totem pole PFC circuit works in DCM, i) turning off the sync switch when a current detecting signal indicative of an AC input current of the totem pole PFC circuit decreases to zero; ii) turning on the main switch at a valley of a switching voltage after expiry of a time delay started from when the AC input current of the totem pole PFC circuit decreases to zero; and iii) turning off the main switch and turning on the sync switch after the main switch is on for a second on-time period;
wherein the switching voltage is a voltage at a connection node of the first switch and the second switch.

19. The control method of claim 18, further comprising:
when the totem pole PFC circuit works in CCM, i) turning on the main switch and turning off the sync switch when the current detecting signal indicative of the AC input current of the totem pole PFC circuit decreases to a current valley reference signal; and ii) turning off the main switch and turning on the sync switch after a first on-time period.

20. The control method of claim 18, wherein the time delay is generated based on a load of the totem pole PFC circuit.

* * * * *